United States Patent [19]
Tsurusaki et al.

[11] Patent Number: 4,852,158
[45] Date of Patent: Jul. 25, 1989

[54] TELEPHONE SYSTEM ALLOWING HOLD RELEASING REQUEST FROM CENTRAL OFFICE LINE

[75] Inventors: Masayuki Tsurusaki, Hino; Tamotsu Wakabayashi, Tokyo; Hiroshi Mano; Hideyasu Mori, both of Hino, all of Japan

[73] Assignee: Kabushiki Kaisha Toshiba, Kawasaki, Japan

[21] Appl. No.: 149,104

[22] Filed: Jan. 27, 1988

[30] Foreign Application Priority Data

Jan. 29, 1987 [JP] Japan .................................. 62-19403

[51] Int. Cl.⁴ ........................................... H04M 1/00
[52] U.S. Cl. .................................... 379/393; 379/162; 379/163
[58] Field of Search ............... 379/162, 163, 393, 208, 379/204

[56] References Cited

U.S. PATENT DOCUMENTS 4,425,479 1/1984 Dubner et al. .................. 379/163 X

FOREIGN PATENT DOCUMENTS 0012165 2/1981 Japan ................................... 379/208

Primary Examiner—James L. Dwyer
Attorney, Agent, or Firm—Finnegan, Henderson, Farabow, Garrett, & Dunner

[57] ABSTRACT

A telephone system which allows external releasing of a holding state set by a holding operation of a telephone set. A signal receiving circuit of the system receives a holding-state releasing signal such as a DTMF signal or the like sent from a central office line to release the hold state of the telephone set on the basis of an output of the circuit.

9 Claims, 7 Drawing Sheets

TELEPHONE SYSTEM ALLOWING HOLD RELEASING REQUEST FROM CENTRAL OFFICE LINE

BACKGROUND OF THE INVENTION

1. Field of the Invention

The present invention relates to a telephone system which allows a hold releasing request from a central office line when the central office line is put in its holding state.

2. Description of the Related Art

Referring to FIG. 9, there is shown a prior art telephone system having a holding function which includes a key telephone set (EKT) 1, a central office line interface circuit unit (COU) 3, an EKT interface circuit unit (STU) 5, a time-division switch circuit unit (TSU) 7, a central control circuit unit (CCU) 9, a power supply circuit unit (PSU) 11, a data highway 13, a power supply bus 15, a pulse code modulation highway (PCM highway) 17, a central office line 19, and an AC plug 21.

The COU 3 comprises a central office line interface circuit 23, a transmission transformer 25, a hybrid circuit 27, a codec 29, a control circuit 31, and a voltage stabilizer circuit 33. The central office interface circuit 23 has a dial-pulse sending circuit, a hook switch circuit, a ringer detecting circuit, an inverted-polarity detecting circuit, a loop current circuit and a loop current detecting circuit (these circuits are not shown in the drawing). The transmission transformer 25 is used to block DC components of a signal received from the central office line 19. The hybrid circuit 27 separates a signal to be transmitted to the central office line 19 from a signal to be received therefrom. The codec 29 converts to an analog signal a transmitting digital signal received from the PCM highway 17 (DA conversion) to transmit the analog signal to the line 19, and also to converts an analog signal received from the line 19 to a digital signal (AD conversion) and then multiplex and sends it to the PCM highway 17. The control circuit 31 receives control data from the central control circuit 61 through the data highway 13 to control the central office interface circuit 23 and also specifies the time slot of the codec 29. The control circuit 31 also receives input data sent from the central office interface circuit 23 and applies it to the central circuit 61 via the data highway 13. The voltage stabilizer circuits 33, 35, 37 and 39 are used as power supplies of circuits mounted on the respective unit boards to receive and stabilize a voltage generated by the power supply circuit 63 through the power supply bus 15, respectively.

The ETK interface circuit unit (STU) 5 is a unit board for interface with the EKT 1. The STU 5 comprises transmission transformers 41 and 43, a power supply circuit or battery 45, hybrid circuits 47 and 49, a codec 51, a control circuit 53 and a voltage stabilizer circuit 35. The transmission transformer 41 is provided to transmit a voice signal to the EKT 1, while the transmission transformer 43 transmits control data to the EKT 1. The battery 45 supplies power to the EKT 1. The hybrid circuits 47 and 49 are used to separate a transmitting signal for a voice signal of the EKT 1 from a receiving signal, and to separate the upstream control data from the downstream control data. The control circuit 53 controls the input and output of the control data to the EKT 1 and specifies the time slot of the codec 51.

The time-division switch circuit unit (TSU) 7 comprises a digital time-division switch 55, a sound source circuit 57, a control circuit 59 and a voltage stabilizer circuit 37. The digital time-division switch 55 performs exchanges between channels in a PCM multiplexed state.

The sound source circuit 57 generates all tones necessary for the digital key telephone system such as a dial tone, a busy tone, a holding tone and so on, and applies these tones to the digital time-division switch 55 in the form of multiplexed data signals respectively. The control circuit 59 controls the switch 55 and the sound source circuit 57.

The central control circuit unit (CCU) 9 comprises a central control circuit 61 and a voltage stabilizer circuit 39. The circuit 61 controls the whole telephone system.

The power supply circuit unit (PSU) 11 comprises a power supply circuit 63 which is connected to an AC power source through the plug 21 attached thereto to supply a voltage to the respective units.

The operation of the telephone system will next be explained.

Now suppose that the system received an incoming signal from the central office line 19. In this case, the in-coming signal from the line 19 is detected by the central office line interface circuit 23 which in turn applies the information of the signal to the control circuit 31. The circuit 31 converts the information to a multiplexed signal and applies it to the central control circuit 61 via the data highway 13. The central control circuit 61 recognizes the received information as the incoming signal from the line 19 and transmits the incoming information to the control circuit 53 of the STU 5 and the control circuit 59 of the TSU 7. The control circuit 59, when receiving the information, controls the sound source circuit 57 to generate a ringing signal from the circuit 57. The circuit 59 also controls the digital time-division switch 55 to cause the ringing signal output data of the sound source circuit 57 to be carried on one of the channels of the PCM highway 17 associated with the time slot in synchronism with the STU 5. On the other hand, the control circuit 53 sends the control data to the EKT 1 through the hybrid circuit 49 and the transmission transformer 43 to activate an incoming circuit of the EKT 1. The codec 51 receives the ringing signal from the digital time-division switch 55, converts it from digital to analogy and sends it to the EKT through the hybrid circuit 47 and the transmission transformer 41, in synchronism with the time slot of the STU 5. The EKT 1 passes the ringing signal through a converter (not shown) provided therein and outputs the signal in the form of sound. As a result, the EKT 1 is informed that there is an incoming signal from the line 19. When the EKT answers, to it, it sends answer information to the control circuit 53 through the transmission transformer 43 and the hybrid circuit 49. The information is received by the central control circuit 61 through the data highway 13, in which case the circuit 61 in turn recognizes that the EKT 1 has answered, sends the information to the control circuit 31 through the data highway 13. The control circuit 31, upon receiving the information, closes the loop current circuit within the central office line interface circuit 23. Simultaneously with it, the central control circuit 61 also sends the EKT answer information to the control circuit 59 which in turn stops the ringing signal of the sound source circuit 57 and controls the digital timedivision n switch 55 to close the central office line 19 and the talking path or channel of the EKT 1, thus allowing the EKT 1 to be put in its talking mode with the line 19.

Now when the EKT 1 is subjected to a holding operation, the EKT 1 transmits the information indicative of the holding state to the central control circuit 61 through the hybrid circuit 49, the control circuit 53 and the data highway 13, at which time the circuit 61 recognizes the holding state and sends the information to the control circuit 59 through the data highway 13. The control circuit 59 controls the digital time-division switch 55 and the sound source circuit 57 to cause the sound source circuit 57 to send a holding tone in place of the transmitting signal of the EKT 1 to the line 19 through the digital time-division switch 55, the PCM highway 17, the codec 29, the hybrid circuit 27, the transmission transformer 25 and the line interface circuit 23, whereby the system is put in its hold state.

When the EKT 1 is subjected to a predetermined operation to release the hold state, a hold releasing signal is sent from the EKT 1 to the central control circuit 61 through the transmission transformer 43, the hybrid circuit 49, the control circuit 53 and the data highway 13, in which case the circuit 61 recognizes the signal information and transmits it to the control circuit 59. The circuit 59, when receiving the information, controls the digital time-division switch 55 and the sound source circuit 57 to send the transmitting signal in place of the holding tone from the EKT 1 through the switch 55, the PCM highway 17, the codec 29, the hybrid circuit 27, the transmission transformer 25 and the line interface circuit 23 to the line 19. As a result, the system is put again in the talking state with the line 19.

When the EKT 1 is subjected to an on-hook operation, a signal indicative of the on-hook is transmitted from the EKT 1 to the central control circuit 61 through the transmission transformer 43, the hybrid circuit 49, the control circuit 53 and the data highway 13. The circuit 61 recognizes the signal as the end of the speech and transmits it to the control circuits 31 and 59 via the data highway 13. The circuit 31, when receiving the signal from the circuit 61, controls the line interface circuit 23 to restore the COU 3 again to the stand-by state. This causes the control circuit 59 to put the digital time-division switch 55 in the stand-by state.

Next, to the central office line 19 from the EKT 1 will be considered. When the EKT 1 is subjected to a line-access keying operation, a line access signal is applied to the control circuit 53 through the transmission transformer 43 and the hybrid circuit 49. In circuit 53 the access signal is multiplexed and transmitted to the central control circuit 61 via the data highway 13. The circuit 61 recognizes the signal as an access signal to the line 19 and applies it to the control circuit 31 of the COU 3 through the data highway 13. This causes the circuit 31 to control the line interface circuit 23 to close the loop circuit.

A dialing operation of the EKT 1 causes a dialed signal to be inputted to the central control circuit 61 through the transmission transformer 43, the hybrid circuit 49, the control circuit 53 and the data highway 13. If the dialed signal corresponds to a dial pulse (DP) signal, then the dial-pulse sending circuit within the line interface circuit 23 sends the DP signal under control of the control circuit 31. When the dialed signal corresponds to a dual-tone multi-frequency (DTMF) signal, the control circuit 59 controls the sound source circuit 57 to send the DTMF signal to the line 19 through the sound source circuit 57, the digital time-division switch 55, the PCM highway 17, the codec 29, the hybrid circuit 27, the transmission transformer 25 and the line interface circuit 23.

However, the prior art telephone system has a problem that when the central office line 19 is put in the holding state from the side of the EKT 1, the speaker cannot talk with the party until such a holding state is released from the side of the EKT 1. Furthermore, it is impossible to release the holding state from the side of the line.

OBJECT AND SUMMARY OF THE INVENTION

In view of the aforementioned problem in the prior art, it is an object of the present invention to provide a telephone system which, even when a central office line is put in its holding state from the side of a terminal, allows a hold releasing request from the side of the line.

In accordance with the present invention, the above object is attained by providing a telephone system comprising means, in a line holding mode, connected to a central office line for detecting a hold releasing signal from the line, and means for requesting the holding state to be released in response to a detection output of the hold-releasing-signal detecting means.

In the present invention, when the hold-state releasing signal is emitted from the line, a signal receiving circuit in the system receives the hold releasing signal and issues a request signal to release the holding means, whereby even when the line is put in the holding state from the side of a terminal, such holding state can be released from the side of the line.

DESCRIPTION OF THE PREFERRED EMBODIMENT

Figure 1:
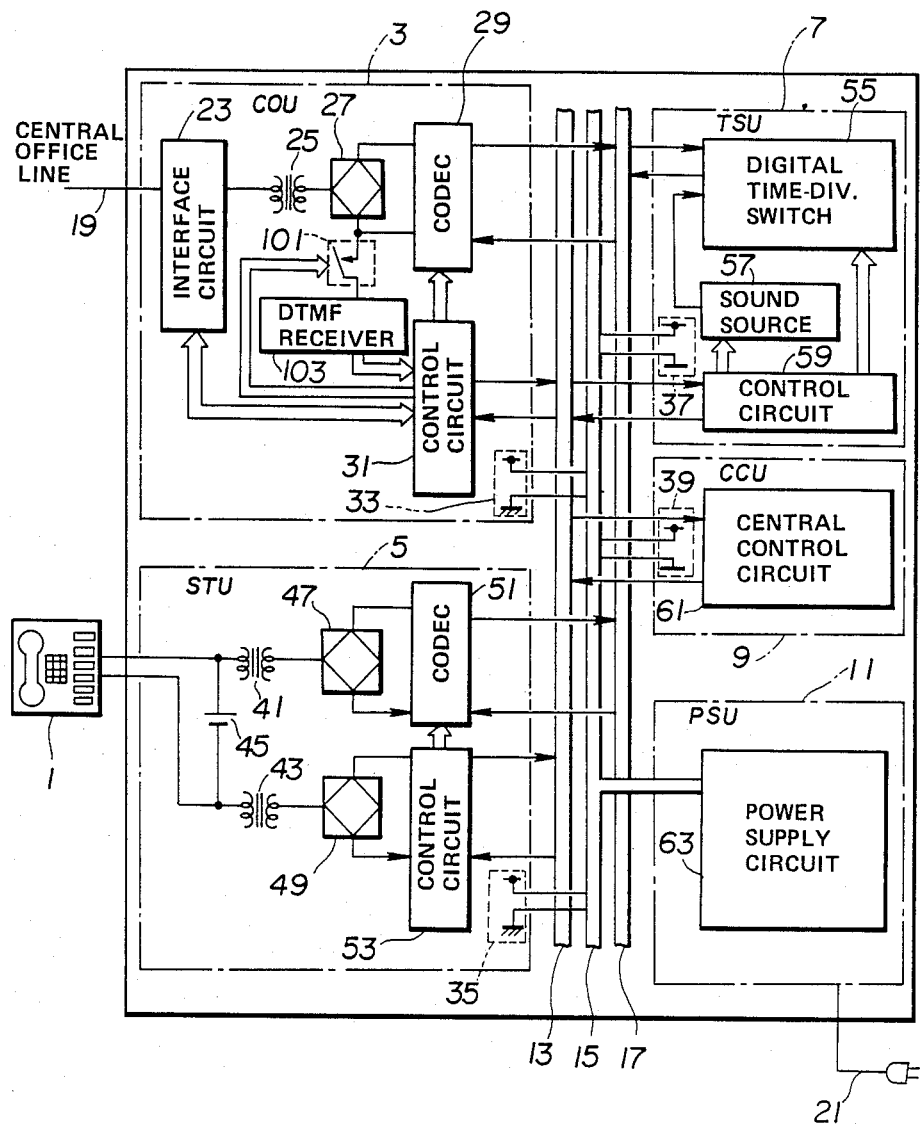
FIG. 1 is a block diagram showing an arrangement of a telephone system in accordance with an embodiment of the present invention.
Figure 9:
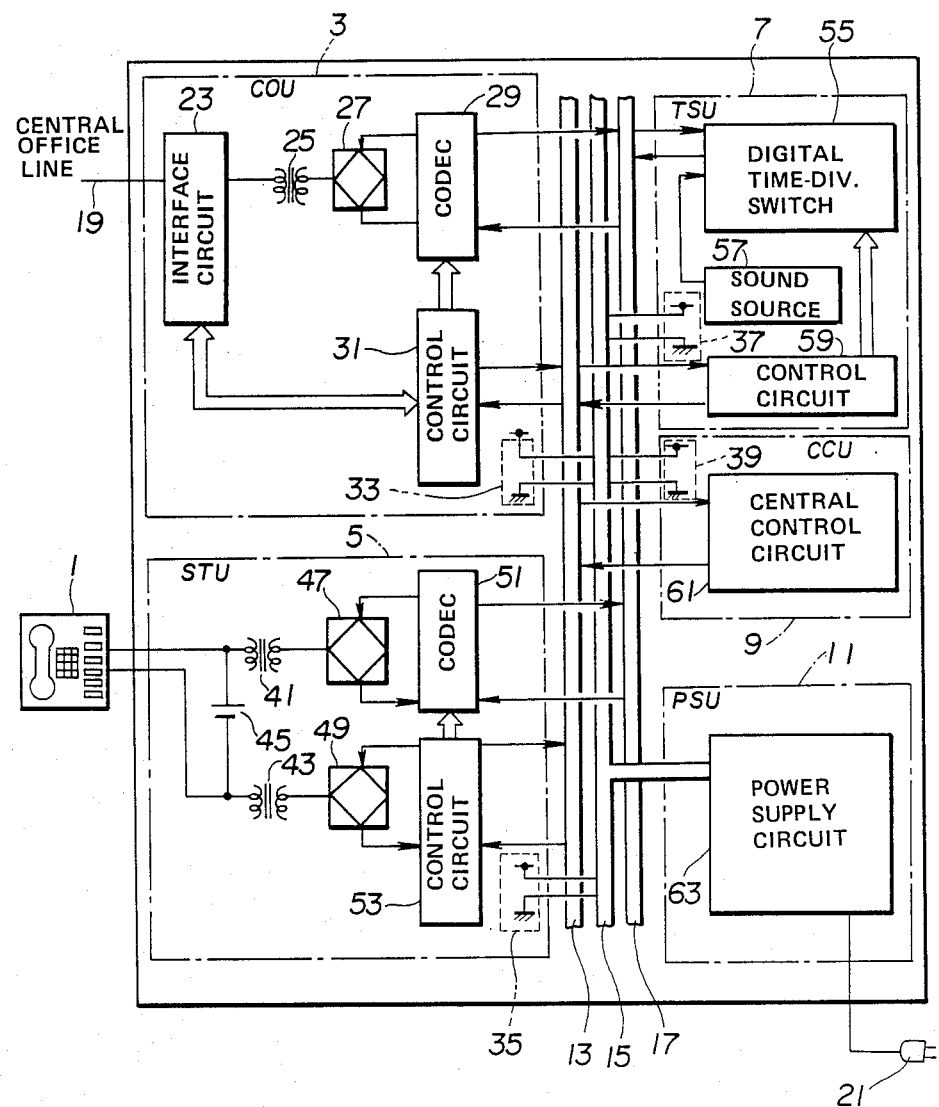
FIG. 9 is a block diagram showing an arrangement of a prior art telephone system.

An embodiment of the present invention will be detailed with reference to attached drawings. Referring first to FIG. 1, there is shown a block diagram of the arrangement of a telephone system in accordance with the embodiment of the present invention, in which constituent elements having the same functions as those in the prior art system shown in FIG. 9 are denoted by the same reference numerals. Explanation thereof overlaps with the foregoing explanation in connection with the prior art is omitted for brevity of the explanation. In the present embodiment, a switch 101 and a dual tone multi-frequency (DTMF) receiver 103 are newly provided in the COU 3. The switch 101 is opened or closed in response to a command from the control circuit 31. The DTMF receiver 103, when applied with a DTMF signal as a hold-state releasing signal from the central office line 19, detects the DTMF signal and sends it to the control circuit 31.

Figure 2:
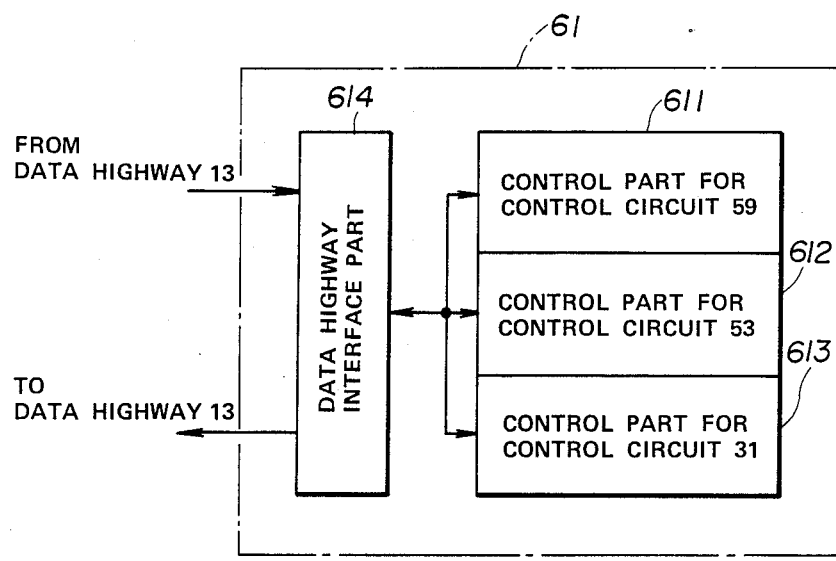
FIG. 2 shows a functional block diagram showing details of a central control circuit shown in FIG. 1.

The central control circuit 61 is provided to control the control circuit 31 of the line interface circuit unit 3, the control circuit 53 of the EKT interface circuit unit 5 and the control circuit 59 of the time-division circuit unit 7. The function of the circuit 61 is shown in FIG. 2 in the form of a block diagram. More specifically, the circuit 61 comprises a control part 611 for controlling the control circuit 59, a control part 612 for controlling the control circuit 53, a control part 613 for controlling the control circuit 31, and a data highway interface part 614 as an interface to the data highway 13.

Figure 3:
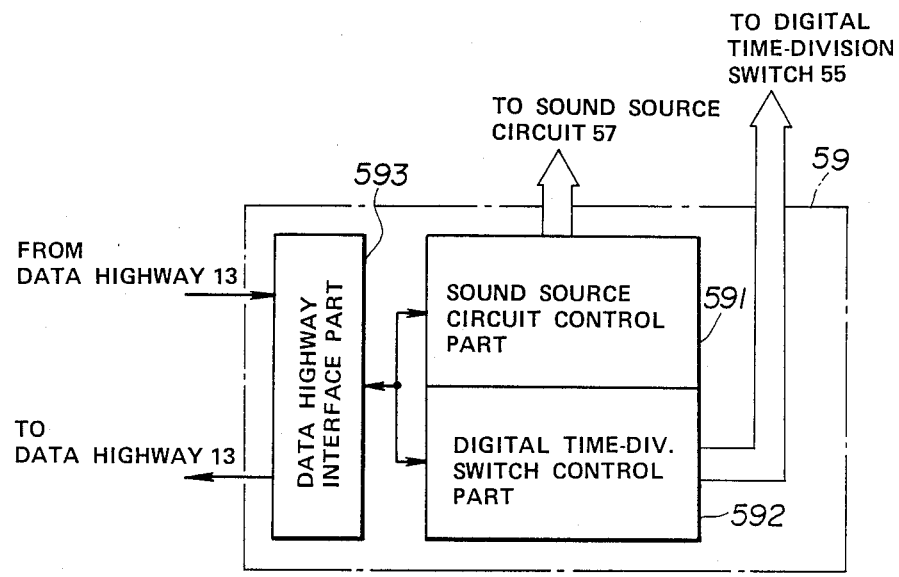
FIG. 3 shows a functional block diagram showing details of a control circuit in a TSU shown in FIG. 1.

The control circuit 59 of the time-division circuit unit 7 controls the sound source circuit 57 and the digital time-division switch 55 within the time-division circuit unit 7. The functional block diagram of the control circuit 59 is shown in FIG. 3. That is, the control circuit 59 comprises a sound source circuit control part 591 for controlling the sound source circuit 57, a digital time-division switch control part 592 for controlling the digital time-division switch 55 and a data highway interface part 593 as an interface to the data highway 13.

Figure 4:
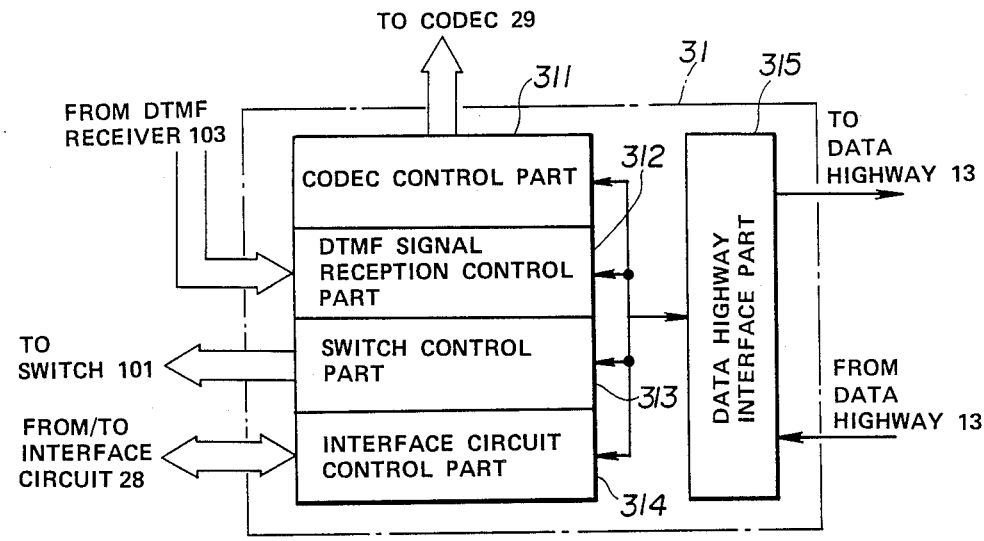
FIG. 4 shows a functional block diagram showing details of a control circuit in a COU shown in FIG. 1.

The control circuit 31 of the line interface circuit unit 3, as shown in FIG. 4, comprises a codec control part 311 for controlling the codec 29, a DTMF signal reception control part 312 for receiving a signal from the DTMF receiver 103, a control part 313 for controlling the opening and closing operation of the switch 101, a line interface circuit control part 314 for controlling the line interface circuit 23, and a data highway interface part 315 as an interface to the data highway 13.

Figure 5:
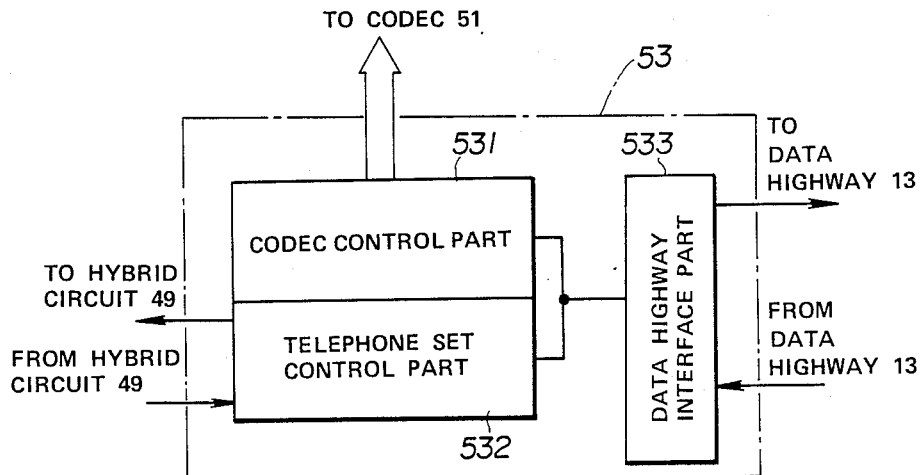
FIG. 5 shows a functional block diagram showing details of a control circuit in an STU shown in FIG. 1.

Further, the control circuit 53 of the EKT interface circuit unit 5, a shown in FIG. 5, comprises a codec control part 531 for controlling the codec 29, key telephone set control part 532 for controlling the EKT 1, and a data highway interface part 533 as an interface to the data highway 13.

The operation of the present embodiment will be explained by referring to a flowchart shown in FIG. 6 and mainly in connection with a case where the central office line is put in the holding state.

When the EKT 1 is subjected to a keying operation of the holding state, a signal indicative of a holding state request is sent from the EKT 1 to the central control circuit 61 through the transmission transformer 43, the hybrid circuit 49, the control circuit 53 and the data highway 13 (step 621). The circuit 61 recognizes this signal as requesting that line 19 be put in the holding state and transmits the signal to the control circuits 31 and 59 through the data highway 13. The control circuit 59, upon receiving this signal from the central control circuit 61, controls the digital time-division switch 55 and the sound source circuit 57 to cause the sound source circuit 57 to generate and output a holding tone onto the line 19 through the digital time-division switch 55, the PCM highway 17, the codec 29, the hybrid circuit 27, the transmission transformer 25 and the line interface circuit 23 (steps 622 and 623). In a parallel operation to the above, the control circuit 31 controllably closes the switch 101 to connect the DTMF receiver 103 to the conversation receiving input wire (step 624). When a DTMF signal for releasing the holding state is transmitted from the party telephone set, the DTMF signal is sent from the party telephone set to the hybrid circuit 27 through the line 19, the line interface circuit 23 and the transmission transformer 25. The circuit 27, which divides the input signal into transmitting and receiving signals, supplies through the switch 101 to the DTMF receiver 103 the DTMF signal sent from the line 19 (step 625). The control circuit 31 in turn transmits the dial information of the DTMF signal through the data highway 13 to the central control circuit 61. When the circuit 61 receiving the dial information signal recognizes it as indicative of a dial number for releasing the holding state (step 626), it sends a holding-state releasing signal to the control circuits 31 and 59 through the data highway 13. The control circuit 31, when receiving this releasing signal, turns off the switch 101 (step 627), while the control circuit 59, when receiving the releasing signal, controls the digital time-division switch 55 and the sound source circuit 57 to stop the generation of the holding tone of the circuit 57, thereby realizing again a conversation mode between the line 19 and EKT 1 (steps 628 and 629). Simultaneously with the above operation, the central control circuit 61 sends a holding-state releasing signal to the control circuit 53. As soon as receiving this signal, the control circuit 53 releases the holding state of the EKT 1 through the hybrid circuit 49 and the transmission transformer 43 and closes the talking circuit within the EKT 1 (step 630). As a result, the party speaker connected to the line 19 can release the holding state and realize conversation with the EKT 1.

Although the holding state of the EKT 1 has been released directly by the holding-state releasing signal sent from the line 19 in the foregoing embodiment, such an arrangement may be employed that the holding-state releasing signal from the line 19 causes the EKT 1 to generate a hold alarm tone and the operator's hold releasing operation at the EKT1 causes the holding state of the EKT 1 to be released.

Figure 6:
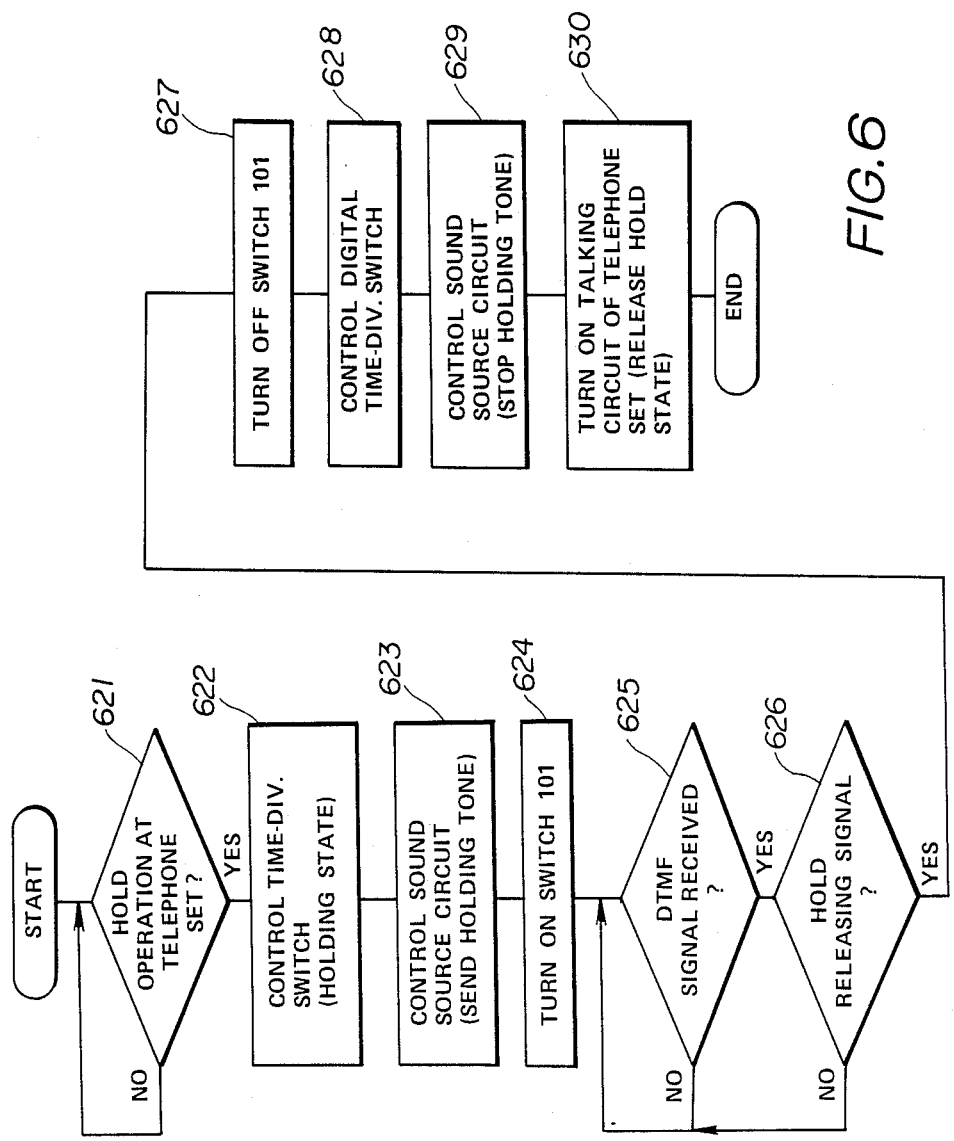
FIGS. 6, 7 and 8 are flowcharts for explaining the operation of different embodiments of the present invention, respectively.
Figure 7:
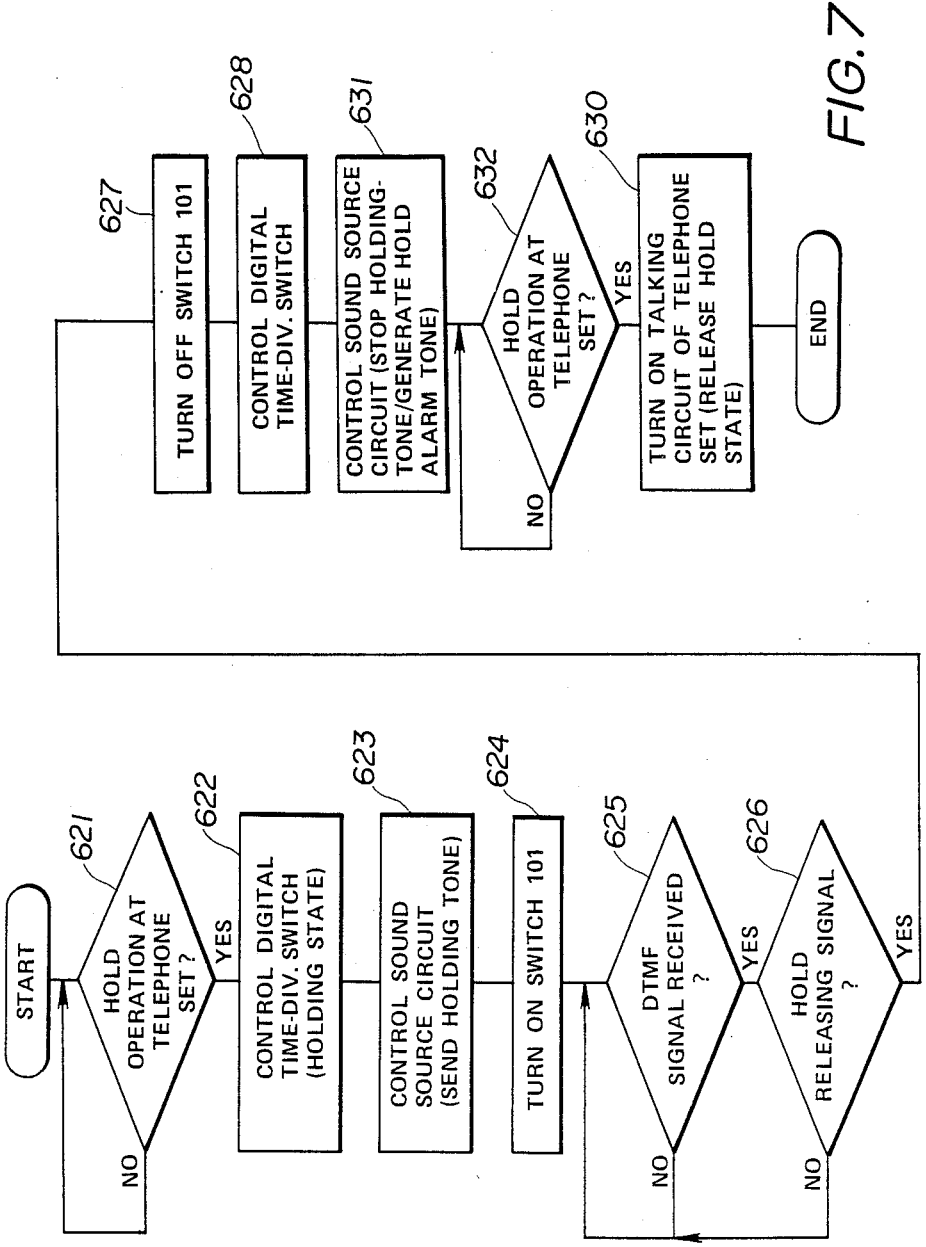

There is shown another embodiment of the operational flowchart of the system of the present invention, in which the same steps as those in FIG. 6 are denoted by the same reference numerals. More specifically, the from the steps 621 to 628 are the same as inn FIG. 6. That is, when the control circuit 59 receives the holding-state releasing signal, it controls cause it to the sound source circuit 57 to stop the generation of the holding tone and instead to generate the hold alarm tone. The hold alarm tone is transmitted from the sound source circuit 57 to the EKT 1 through the digital time-division switch 55, the PCM highway 17, the codec 51, the hybrid circuit 47 and the transmission transformer 41 (step 631). This causes the EKT 1 to generate a hold alarm sound. When a person located by the EKT 1 performs a predetermined hold releasing operation in response to the hold releasing sound, this releasing operation is detected by the central control circuit 61 (step 632), after which the circuit 61 sends a hold releasing signal to the EKT 1 through the data bus 13, the control circuit 53, the hybrid circuit 49 and the transmission transformer 43, whereby the talking circuit of the EKT 1 is turned on (step 630) and the EKT 1 is put in the conversation mode.

Figure 8:
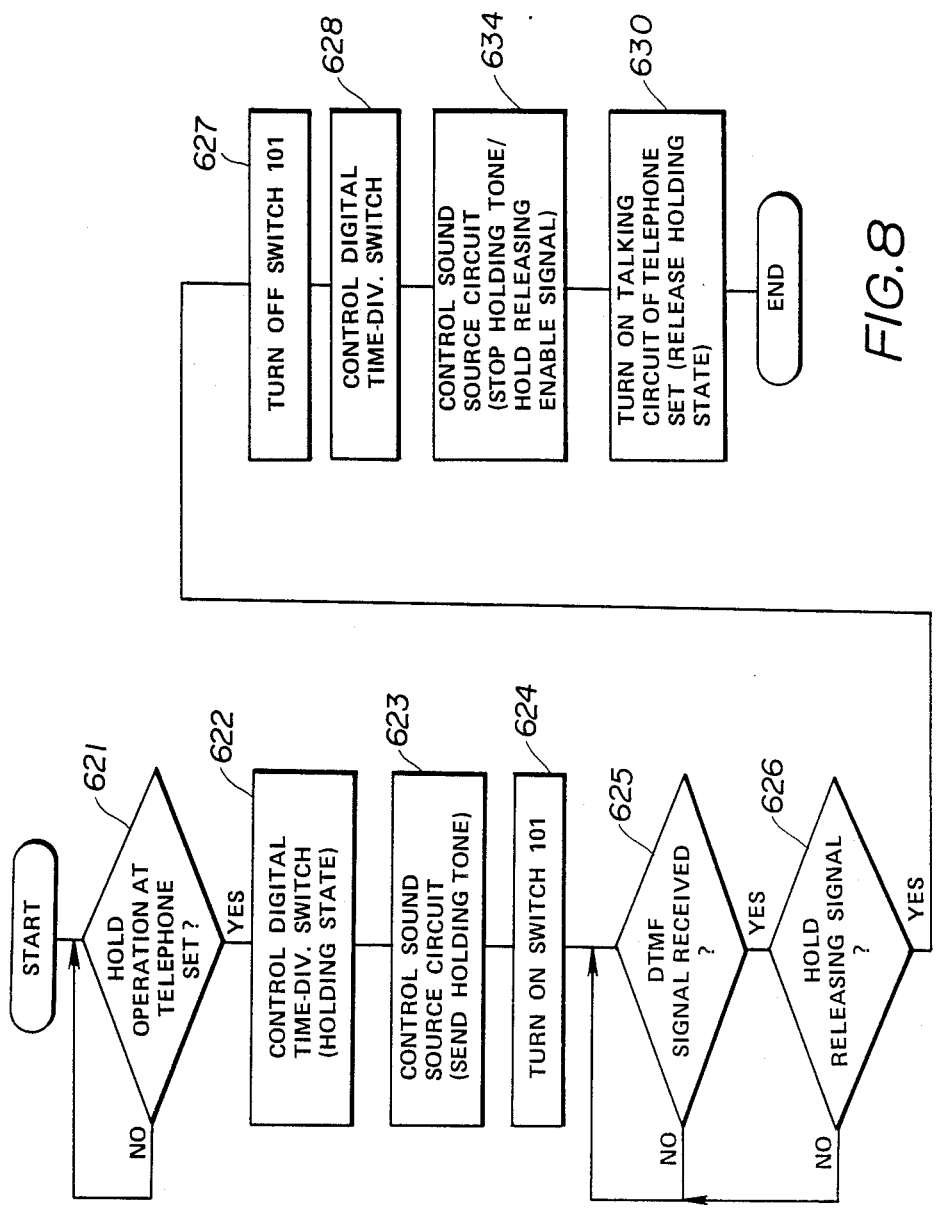

As yet another method of the hold-state releasing sequence, the sound source circuit 57 generates a holding-tone release enable signal and sends it onto the line 19 during transmission of the holding tone. The party speaker, when hearing this enables signal, sends the DTMF signal to the system through his dialing operation for the hold releasing, so that the EKT 1 is informed that it is possible to release the holding state and only during transmission of the holding-tone release enable signal, the switch 101 is closed to get ready for reception of the DTMF signal from the line 19. FIG. 8 shows a flowchart for explaining the operation of such an arrangement. In this arrangement, the sound source circuit is controlled to generate the holding tone and the hold release enable signal and to stop the generation both the tone and enable signal (step 633).

According to this method, the use of a signal other than the DTMF signal, for example, the use of a voice signal from the line 19 enables the prevention of erroneous operation of the DTMF receiver 103.

What is claimed is:

1. A telephone system comprising:
   means for separating a telephone set from a telephone line and sending a holding tone to said telephone line in response to a holding operation of said telephone set, said telephone line being placed in a holding mode when said telephone set is separated from said telephone line;
   means connected to said telephone line in said holding mode for detecting a hold releasing signal from said telephone line; and
   means for automatically releasing said holding mode in response to a detection output of said hold-releasing-signal detecting means.

2. A telephone system as set forth in claim 1, wherein said hold releasing signal is a DTMF signal and said hold-releasing-signal detecting means includes a DTMF receiver.

3. A telephone system as set forth in claim 1 wherein said hold-releasing-signal detecting means includes a detection circuit for detecting said hold releasing signal and a switch circuit for connecting said detection circuit to said telephone line in said holding mode.

4. A telephone system as set forth in claim 1, wherein said holding-mode releasing means includes means for connecting said telephone set to said telephone line and means for turning on a talking circuit of said telephone set.

5. A telephone system comprising:
   means for separating a telephone set from a telephone line and sending a holding tone to said telephone line in response to a holding operation of said telephone set, said telephone line being placed in a holding mode when said telephone set is separated from said telephone line;
   means connected to said telephone line in said holding mode for detecting a hold releasing signal from said telephone line;
   means for automatically releasing said holding mode in response to a detection output of said holding-releasing-signal detecting means; and
   means for generating a hold release enable signal together with said holding tone, and
   wherein said hold-releasing-signal detecting means is connected to said line only during generation of said hold release enable signal.

6. A telephone system comprising:
   line interface means connected to a telephone line;
   telephone set interface means connected to a telephone set;
   time-division switch means connected to said line interface means and said telephone set interface means through a PCM highway for performing a digital time-division exchange between said telephone line and said telephone set; and
   control means connected to said telephone line interface means, said telephone set interface means and said time-division switch means through a data highway for controlling said line interface means, said telephone set interface means and said time-division switch means; and
   wherein said line interface means comprises:
   a speech reception circuit for receiving a speech signal from the line; and
   means connected to said speech reception circuit in a holding mode based on a holding operation of said telephone set; and
   wherein said control means comprises means for releasing said holding mode in response to a detection output of said hold-releasing-signal detecting means.

7. A telephone system as set forth in claim 6, wherein said hold releasing signal is a DTMF signal and said hold-releasing-signal detecting means includes a DTMF receiver.

8. A telephone system as set forth in claim 6, wherein said hold-releasing-signal detecting means includes means for receiving said hold releasing signal;
   switch means turned on in response to a control signal from said control means in said holding mode to connect said hold-releasing-signal reception means to the speech reception circuit of said line interface means; and
   means for generating a detection output when receiving said hold releasing signal from said hold-releasing-signal receiving means.

9. A telephone system as set forth in claim 6. wherein said hold releasing means includes means for performing an exchange connection between said telephone set interface means associated with the telephone set subjected to the holding operation and said line interface means associated with said holding line under control of said time-division switch means, and means for turning on the talking circuit of the telephone set subjected to the holding operation through said telephone set interface means.

* * * * *